(12) United States Patent
Zhang et al.

(10) Patent No.: US 9,706,565 B2
(45) Date of Patent: Jul. 11, 2017

(54) METHOD AND DEVICE FOR VIDEO TRANSMISSION

(71) Applicant: Huawei Technologies Co., LTD., Shenzhen (CN)

(72) Inventors: Jian Zhang, Shenzhen (CN); Wei Quan, Shenzhen (CN); Peng Zhang, Shenzhen (CN); Yi Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 14/305,460

(22) Filed: Jun. 16, 2014

(65) Prior Publication Data

US 2014/0321378 A1    Oct. 30, 2014

Related U.S. Application Data

(63) Continuation of application No. PCT/CN2012/086234, filed on Dec. 8, 2012.

(30) Foreign Application Priority Data

Dec. 14, 2011 (CN) .......................... 2011 1 0418170

(51) Int. Cl.
*A47L 15/00* (2006.01)
*H04W 72/12* (2009.01)
(Continued)

(52) U.S. Cl.
CPC ......... *H04W 72/1247* (2013.01); *H04L 65/80* (2013.01); *H04L 67/322* (2013.01); *H04W 4/18* (2013.01)

(58) Field of Classification Search
None
See application file for complete search history.

(56) References Cited

U.S. PATENT DOCUMENTS 8,345,768 B1 * 1/2013 Hobbs ....................... G06T 9/00
                                                                  375/240.24
8,885,514 B2 * 11/2014 Cui .......................... H04B 7/155
                                                                  370/254

(Continued)

FOREIGN PATENT DOCUMENTS

CN    1630363 A    6/2005
CN    1706123 A    12/2005

(Continued)

*Primary Examiner* — Hassan Kizou
*Assistant Examiner* — Deepa Belur
(74) *Attorney, Agent, or Firm* — Brinks Gilson & Lione

(57) ABSTRACT

Embodiments of the present application provide a method and a device for video transmission, which relates to the field of communications and is able to reduce feedback time, thus realizing the purpose of fully using resources and reducing data loss. The method includes at least the following operations: a base station receiving a second video data packet sent by a server and first feedback information about a first video data packet sent by user equipment, performing scheduling process according to the first feedback information, and after the scheduling process, transmitting the second video data packet to the user equipment according to the result of the scheduling process.

11 Claims, 4 Drawing Sheets

(51) Int. Cl.
*H04L 29/08* (2006.01)
*H04L 29/06* (2006.01)
*H04W 4/18* (2009.01)

(56) References Cited

U.S. PATENT DOCUMENTS

| | | | |
|---|---|---|---|
| 2005/0063389 A1 | 3/2005 | Elliott et al. | |
| 2005/0111394 A1 | 5/2005 | Jung et al. | |
| 2005/0172028 A1* | 8/2005 | Nilsson | H04L 29/06 709/231 |
| 2006/0019662 A1* | 1/2006 | Andrews | H04L 45/00 455/435.3 |
| 2008/0259799 A1* | 10/2008 | van Beek | H04L 47/2416 370/235 |
| 2009/0021572 A1* | 1/2009 | Garudadri | H04L 47/10 348/14.01 |
| 2010/0017530 A1 | 1/2010 | Gaur | |
| 2010/0135229 A1 | 6/2010 | Loehr et al. | |
| 2011/0026470 A1 | 2/2011 | Joo et al. | |
| 2012/0294161 A1* | 11/2012 | Sunay | H04W 72/1236 370/252 |
| 2012/0307886 A1* | 12/2012 | Agarwal | H04W 4/18 375/240.02 |
| 2014/0321378 A1* | 10/2014 | Zhang | H04L 67/322 370/329 |

FOREIGN PATENT DOCUMENTS

| | | |
|---|---|---|
| CN | 101026866 A | 8/2007 |
| CN | 101155311 A | 4/2008 |
| CN | 101690315 A | 3/2010 |
| EP | 2 388 963 A1 | 11/2011 |
| JP | 2005-142808 A | 6/2005 |
| JP | 2010-016813 A | 1/2010 |
| JP | 2011-035889 A | 2/2011 |
| JP | 2011-040797 A | 2/2011 |
| JP | 2011-244458 A | 12/2011 |
| WO | WO 2011/066088 A1 | 6/2011 |

* cited by examiner

METHOD AND DEVICE FOR VIDEO TRANSMISSION

CROSS-REFERENCE TO RELATED APPLICATIONS

This application is a continuation of International Application No. PCT/CN2012/086234, filed on Dec. 8, 2012, which claims priority to Chinese Patent Application No. 201110418170.8, filed on Dec. 14, 2011, both of which are hereby incorporated by reference in their entireties.

TECHNICAL FIELD

The present application relates to the field of communications and, in particular, to a method and a device for video transmission.

BACKGROUND

Currently, the application of multi-media services based on mobile communication network become more and more widely, such as video conference, video surveillance and tele-medicine. In order to effectively utilize the wireless network resources and improve the real-time performance of video application, the video transmission needs to be correspondingly adjusted according to the change of channel quality.

Generally, a user equipment and a server can transmit a video data packet to each other. The server adjusts the video transmission by receiving feedback information of the user equipment, the feedback time used is relative long, thus causing that the server cannot adjust the video transmission in time, which may easily result in underutilization of resources or data loss.

SUMMARY

Embodiments of the present application provide a method and a device for video transmission, which can reduce feedback time and, thus, realize the purpose of fully using resources or reducing data loss.

In order to achieve the above purpose, embodiments of the present application adopt the following technical solutions:

A method for video transmission, including:

receiving, by a base station, a second video data packet transmitted by a server, where the second video data packet is a current set of video data packets transmitted by the server;

receiving, by the base station, first feedback information about a first video data packet transmitted by a user equipment, and performing a scheduling process according to the first feedback information, where, the first video data packet is a previous set of video data packets of the second video data packet, and the previous set of video data packets is received from the server and forwarded to the user equipment by the base station;

after the scheduling process, transmitting the second video data packet to the user equipment according to a result of the scheduling process.

A base station, including:

a first receiving unit, configured to receive a second video data packet transmitted by a server and first feedback information about a first video data packet transmitted by a user equipment; where the second video data packet is a current set of video data packets, and the first video data packet is a previous set of video data packets of the second video data packet; and the previous set of video data packets is received from the server and forwarded to the user equipment by the base station;

a first processing unit, configured to perform a scheduling process according to the first feedback information received by the first receiving unit;

a first transmitting unit, configured to transmit the second video data packet to the user equipment according to a result of the scheduling process, after the first processing unit performs the scheduling process.

A method for video transmission, including:

receiving, by a base station, third feedback information transmitted by a user equipment, where the third feedback information is quantity of video data packets in each transmit buffer of the user equipment;

performing, by the base station, a scheduling process to the video data packets in the transmit buffers of the user equipment according to the third feedback information;

receiving, by the base station, a scheduling processed video data packet transmitted by the user equipment, and transmitting the scheduling processed video data packet to a server.

A base station, including:

a first transceiver unit, configured to receive third feedback information transmitted by a user equipment, where the third feedback information is quantity of video data packets in each transmit buffer of the user equipment;

a second processing unit, configured to perform a scheduling process to the video data packets in transmit buffers of the user equipment according to the third feedback information received by the first transceiver unit;

the first transceiver unit is further configured to receive a scheduling processed video data packet transmitted by the user equipment, and transmit the scheduling processed video data packet to a server.

A method for video transmission, including:

detecting, by a base station, wireless network state and transmitting network state information to a user equipment, so that the user equipment feeds back the network state information to a server;

receiving, by the base station, a video data packet obtained by the server through encoding according to the network state information;

transmitting, by the base station, the video data packet to the user equipment.

A method for video transmission, including:

receiving, by a user equipment, network state information transmitted by a base station and feeding back the network state information to a server, so that the server obtains a video data packet through encoding according to the network state information;

receiving, by the user equipment, the video data packet forwarded by the base station.

A method for video transmission, including:

receiving, by a server, network state information fed back by a user equipment;

adjusting, by the server, an encoding level according to the network state information and encoding video data according to the adjusted encoding level, and encapsulating the encoded data into a video data packet; and transmitting, by the server, the video data packet to a base station, so that the base station forwards the video data packet to the user equipment.

A base station, including:

a detecting unit, configured to detect wireless network state and transmit network state information to a user equipment, so that the user equipment feeds back the network state information to a server;

a fifth receiving unit, configured to receive a video data packet obtained by the server through encoding according to the network state information after the detecting unit detects the network state information;

a first transmitting unit, configured to transmit the video data packet received by the fifth receiving unit to the user equipment.

A user equipment, including:

a sixth receiving unit, configured to receive network state information transmitted by a base station;

a feedback unit, configured to feedback the network state information received by the sixth receiving unit to a server, so that the server obtains a video data packet through encoding according to the network state information;

the sixth receiving unit is further configured to receive the video data packet forwarded by the base station.

A server, including:

an eighth receiving unit, configured to receive network state information fed back by a user equipment;

an encoding and encapsulating unit, configured to adjust an encoding level according to the network state information received by the eighth receiving unit and encode video data according to the adjusted encoding level, and encapsulate the encoded data into a video data packet;

a second transmitting unit, configured to transmit the video data packet encapsulated by the encoding and encapsulating unit to a base station, so that the base station forwards the video data packet to the user equipment.

Embodiments of the present application provide a method and a device for video transmission, the base station receives a second video data packet transmitted by a server and first feedback information about a first video data packet transmitted by a user equipment, and performs a scheduling process according to the first feedback information, and transmits the second video data packet to the user equipment according to the result of the scheduling process after the scheduling process, therefore, the base station does not need to transmit the feedback information to the server again, thereby reducing the feedback time, that is, the base station can perform the scheduling process by utilizing the feedback information in time, therefore, resources can be fully used or data loss can be reduced, the real-time performance of video transmission is improved, and air-interface resources are fully used, thus system performance is improved. In addition, the base station receives third feedback information transmitted by a user equipment, and performing a scheduling process to video data packets in transmit buffers of the user equipment according to the third feedback information; then receives a scheduling processed video data packet, and transmits the scheduling processed video data packet to a server, therefore, the base station does not need to transmit the feedback information to the server again, thereby reducing the feedback time, that is, the base station can perform the scheduling process by utilizing the feedback information in time, therefore, resources can be fully used or data loss can be reduced, the real-time performance of video transmission is improved, and air-interface resources are fully used, thus system performance is improved. In addition, the base station detects wireless network state and transmits network state information to a user equipment, so that the user equipment feeds back the network state information to a server, and the server adjusts an encoding level according to the received network state information and encoded the video data according to the adjusted coding level, encapsulates the coded data into a video data packet, transmits the processed video data packet to a base station, so that the base station forwards the processed video data packet to the user equipment, that is, the network state information is detected by the base station, which is more prompt than the feedback information detected by the user equipment, thereby reducing the feedback time, that is, the server can perform the scheduling process by utilizing the network state information in time, therefore, resources can be fully used or data loss can be reduced, the real-time performance of video transmission is improved, and air-interface resources are fully used, thus system performance is improved.

BRIEF DESCRIPTION OF DRAWINGS

In order to make the technical solutions of embodiments of the present application or the technical solutions in the prior art more clear, the accompanying drawings used in the description of embodiments of the present application or in the prior art are briefly described hereunder. Obviously, the described drawings are merely some embodiments of present application. For persons skilled in the art, other drawings may be obtained based on these drawings without any creative work.

DESCRIPTION OF EMBODIMENTS

The technical solutions in embodiments of the present application are hereinafter described clearly and completely with reference to the accompanying drawings in embodiments of the present application. Obviously, the described embodiments are only a part of embodiments of the present application, rather than all embodiments of the present application. All the other embodiments obtained by persons of ordinary skill in the art based on embodiments of the present application without any creative efforts shall fall within the protection scope of the present application.

Embodiment 1

Figure 1:
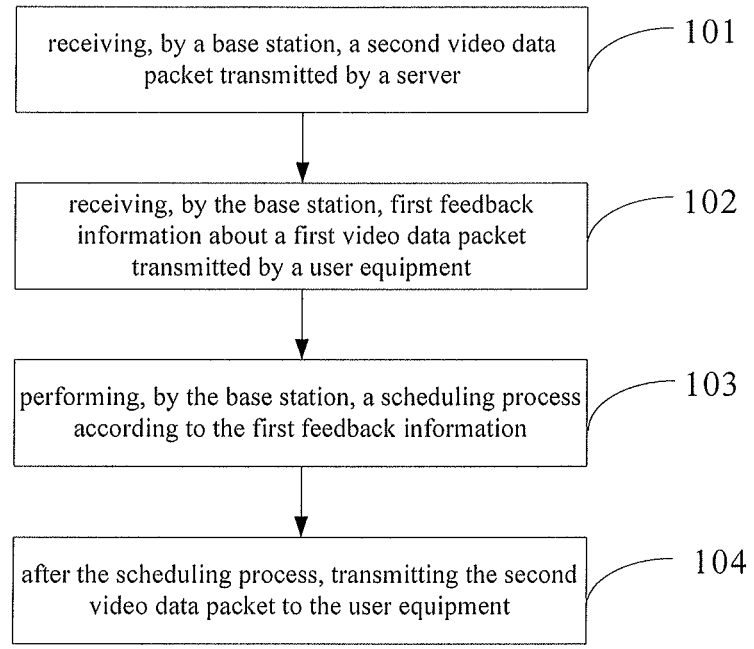
FIG. 1 is a schematic flow chart of a method for video transmission according to Embodiment 1 of the present application.

Embodiments of the present application provide a method for video transmission, where the method is, transmitting, by a server, a video data packet to a user equipment. As shown in FIG. 1, the method includes the following steps of:

101, receiving, by a base station, a second video data packet transmitted by a server.

The second video data packet may be: a set of video data packets, which is obtained by encapsulating an encoded stream of each region into a video data packet respectively by the server, where the encoded streams of regions with different importance are obtained by encoding data in the regions with different importance in a video image according to different encoding modes. The second video data packet may include a video data packet of a one-frame or a multi-frame video image, encoded streams of regions with different importance are obtained by encoding data in regions with different importance in each frame of video image according to different encoding modes, and then encoded streams of each region are encapsulated into a video data packet respectively, thus each of the regions with different importance in the second video data packet has one or more video data packets.

Specifically, during the encoding process, since the final observer of an image is human eyes which have different visual sensitivities for different regions, thus data of the video image may be divided into data in regions with different importance according to the different visual sensitivities of the human eyes, and then the data in regions with different importance is encoded separately, thereby a plurality of encoded streams corresponding to the regions with different importance are obtained. Specifically, the regions with different importance may employ different encoding types, for example, the most important region employs an encoding type with the highest quality, and the least important region employs an encoding type with the lowest quality; the regions with different importance may also employ a same encoding type and apply different encoding rates, for example, the most important region employs the highest coding rate, and the least important region employs the lowest coding rate; the regions with different importance may also employ layered encoding methods, for example, the least important region employs a first-layer encoding, i.e. only a base layer, the second important region employs a two-layer encoding, i.e. including the base layer and a first reinforcement layer, and the most important region employs a three-layer encoding method, i.e. including the base layer, the first reinforcement layer, and a second reinforcement layer. Herein, the data of the video image may be divided into data of two or more than two regions according to different visual sensitivities of the human eyes, which is not limited thereto.

The second video data packet is transmitted by using one or more data bearers/connections. That is, the second video data packet may be transmitted to the base station through one bearer/connection, and may also be transmitted to the base station through a plurality of bearers/connections. After receiving the video data packets in the second video data packet through a plurality of bearers/connections, the base station will store the second video data packet in different storage areas according to different bearers/connections. Such transmission method belongs to the prior art, which can be understood clearly by persons skilled in the art, and will not be repeated herein.

102, receiving, by the base station, first feedback information about a first video data packet transmitted by a user equipment.

The first video data packet is a previous set of video data packets of the second video data packet, and the second video data packet is a current set of video data packets transmitted by the server; the previous set of video data packets or the current set of video data packets is received from the server and forwarded to the user equipment by the base station. The set of video data packets herein refers to a series of video data packets between two feedback information transmitted by the user equipment and received by the base station, or a series of video data packets transmitted by the server to the base station during a previous time period; the current set of video data packets is a series of video data packets which are being currently transmitted by the server or are waiting for the scheduling for transmission of the base station. The first video data packet is a series of video data packets between the first feedback information and the previous feedback information when feedback information is periodically transmitted, or a series of video data packets transmitted by the server to the base station during a previous time period when feedback information is event-based transmitted.

After receiving a first video data packet transmitted by the base station, the user equipment will detect reception on the user equipment itself based on the first video data packet, and will transmit a parameter representing the reception on the user equipment itself to the base station in the manner of first feedback information. Specifically, the manner of the first feedback information may be a manner such as a PDCP (packet data convergence protocol) status report, a RLC (radio link control) status report, an MAC CE (media access control, control elements), and an RRC (radio resource control) message; may use an existing message to which a new IE (Information Element) is added, and may also use a new message.

The first feedback information may include: at least one of parameters including relative time delay, packet loss ratio, average throughput, and data amount of a receive buffer or a play-out buffer of the user equipment. The relative time delay refers to a relative time delay of a video data packet arriving later with reference to a video data packet of a certain frame arriving previously. The packet loss ratio may be a video data packet discarded by the user equipment due to the video data packet arrives at the receive buffer of the user equipment too late and thus cannot be decoded; may also be a total packet loss ratio detected by the user equipment, which includes a packet loss during a transmission process, and a packet discarded by the user equipment due to arriving too late. The average throughput is an average throughput of video data packets measured by the user equipment during a measuring time. The data amount of the receive buffer or the play-out buffer of the user equipment is the quantity of video data packets in the receive buffer or the play-out buffer of the user equipment.

103, performing, by the base station, a scheduling process according to the first feedback information.

Alternatively, before performing the scheduling process according to the first feedback information, the base station may further perform step S1:

S1, reading, by the base station, encoded streams of regions with different importance in the second video data packet.

Specifically, the base station may read the second video data packet by adopting a DPI (deep packet interpretation) technique, so as to distinguish the encoded streams corresponding to the video data packet.

Further, in order to perform the scheduling process to video data packets corresponding to the encoded streams of different regions respectively, the base station may use step S21 or S22.

S21, storing, by the base station, video data packets, which are obtained by encapsulating the encoded streams of regions with different importance in the second video data packet, into different buffers respectively.

After recognizing the encoded streams corresponding to each video data packet in the second video data packet, the base station may store the video data packets in buffers corresponding to the encoded streams of regions with the importance, so that the base station performs a scheduling process respectively to video data packets corresponding to the encoded streams of regions with different importance. The video data packets corresponding to the coding streams of regions with different importance have different scheduling priorities.

S22, configuring, by the base station, different radio bearers (RB) respectively for the video data packets which are obtained by encapsulating the encoded streams of regions with different importance.

The different RBs have different scheduling priorities. Each of the RBs corresponds to one PDCP entity and one RLC entity, i.e. a plurality of RBs corresponds to a same video service. The base station configures a new RB for a user equipment through a dedicated massage. The dedicated message may be an RRC Connection Reconfiguration message, and may also be a new RRC message. After receiving the new RB configuration in the dedicated message transmitted by the base station, the user equipment applies the configuration message. The received different video data packets are stored in corresponding receive buffers or in corresponding PDCP/RLC entities.

If the first feedback information may include at least one of the relative time delay, the packet loss ratio, an initial play-out time delay, the average throughput, and the data amount of the receive buffer or the play-out buffer of the user equipment, the performing, by the base station, the scheduling processing according to the feedback information specifically includes:

Comparing, by the base station, the first feedback information with second feedback information, where the second feedback information being feedback information for a previous set of video data packets of the first video data packet.

If the feedback result is that the quality of reception gets worse, i.e. the result of the comparison includes at least one of the following circumstances: the relative time delay becomes longer, the packet loss ratio becomes higher, the average throughput is decreased, and the data amount of the play-out buffer is decreased; then the scheduling process is performed according to at least one of following manners: discarding a video data packet obtained by encapsulating an encoded stream of data in a least important region, reducing a scheduling priority of the video data packet obtained by encapsulating a an encoded stream of data in the least important region, raising a scheduling priority of a video data packet obtained by encapsulating an encoded stream of data in a most important region, and raising a scheduling priority of the user equipment. Meanwhile, the base station needs to record the current strategy of treating different encoded streams. After the base station adjusts and applies the current strategy, if it is found that the feedback result of the user equipment is that the quality of video still gets worse, the base station may further adjust the strategy, e.g. discarding a video data packet corresponding to coding streams of two or more least important regions, such process may be performed repeatedly until only a video data packet corresponding to encoded streams of the most important region is remained. On the contrary, if the feedback result is that the quality of reception gets better, i.e. the result of the comparison includes at least one of the following circumstances: the relative time delay becomes shorter, the packet loss ratio becomes lower, the average throughput is increased, and the data amount of the play-out buffer is increased; then the scheduling process is performed according to at least one of following manners: raising priority of a video data packet obtained by encapsulating an encoded stream of data in a least important region, not discarding the second video data packet, and reducing a scheduling priority of the user equipment.

Alternatively, if the first feedback information includes data amount of the receive buffer of the user equipment, the performing, by the base station, the scheduling process according to the first feedback information includes:

If the data amount of the receive buffer is less than or equal to a predetermined first minimum protection threshold, raising the scheduling priority of the user equipment, and/or, discarding a video data packet obtained by encapsulating an encoded stream of data in a least important region; and/or, if the data amount of the receive buffer is greater than or equal to a predetermined first highest protection threshold, reducing the scheduling priority of the user equipment. Meanwhile, the base station needs to record a current adjustment strategy, so that the base station can make a further adjustment based on the current adjusted strategy when receiving next feedback information. For example, when the data amount of the receive buffer in the feedback information received by the base station is greater than or equal to the first highest protection threshold, the base station reduces the scheduling priority of the user equipment; if the data amount of the receive buffer in the next feedback information received by the base station is still greater than or equal to the first highest protection threshold, the base station reduces the scheduling priority of the user equipment again based on the scheduling priority of the user equipment reduced last time.

The first minimum protection threshold value and the first highest protection threshold value may be default configurations of a protocol, i.e. may be preset within the base station; may also be transmitted by the server to the base station; may still be reported by the user equipment to the base station, where a message for reporting the first minimum protection threshold value by the user equipment may be an MAC CE, may also be an RRC message; may be an existing message to which a new IE is added, and may also be a new message. The first minimum protection threshold value and the first highest protection threshold value take different values.

104, after the scheduling process, transmitting the second video data packet to the user equipment.

After performing the scheduling process to the user equipment or the second video data packet, the base station will transmit the second video data packet to the user equipment according to the result of the scheduling process.

It should be noted that, since all the foregoing steps 101~104 may be performed in a continuous loop, however, when a server transmits a first set of vide data packets to a user equipment through a base station, since that the user equipment has not received a video data packet, the user equipment does not transmit feedback information to the base station, hence, the base station does not need to perform a scheduling process to the first set of vide data packets, and directly transmits the first set of vide data packets to the user equipment transparently.

Further, during the process of performing the steps 101~104, the base station will receive video application state information at any time, where the video application state information is transmitted by the user equipment to the base station at any time. If the video application state information is off, the base station stops the scheduling process and transmission of a subsequent video data packet for the user equipment; or the base station transmits a stop notice to the server, so that the server stops transmission of a subsequent video data packet for the user equipment; if the video application state information is stop or pause, the base station pauses the scheduling process and transmission of a subsequent video data packet for the user equipment; or the base station transmits a pause notice to the server, so that the server pauses transmission of a subsequent video data packet for the user equipment; if the video application state information is buffer, the base station continues with the scheduling process and transmission of a subsequent video data packet for the user equipment.

Figure 2:
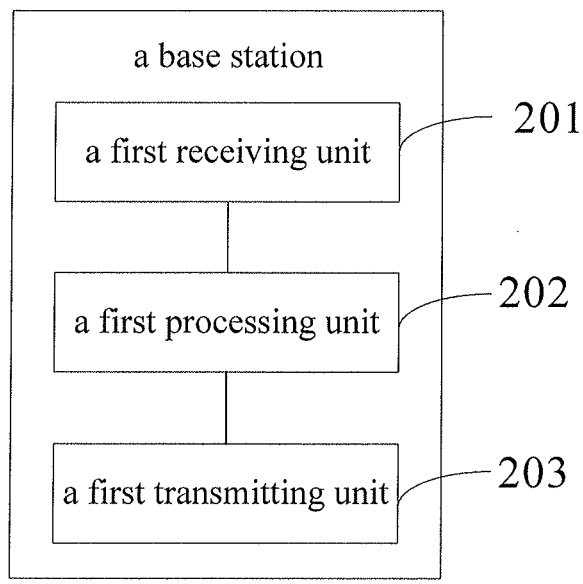
FIG. 2 is a structural block diagram of a base station according to Embodiment 1 of the present application.

Embodiments of the present application also provide a base station, as shown in FIG. 2, including a first receiving unit 201, a first processing unit 202, and a first transmitting unit 203.

The first receiving unit 201 is configured to receive a second video data packet transmitted by a server and first feedback information about a first video data packet transmitted by a user equipment.

The second video data packet received by the first receiving unit 201 is a current set of video data packets, and the first video data packet is a previous set of video data packets of the second video data packet; the previous set of video data packets is received from the server and forwarded to the user equipment by the base station. The set of video data packets herein refers to a series of video data packets between two feedback information transmitted by the user equipment and received by the base station, or a series of video data packets transmitted by the server to the base station during a previous time period; the current set of video data packets is a series of video data packets which are being currently transmitted by the server or is waiting for the scheduling for transmission of the base station. The first video data packet is a series of video data packets between the first feedback information and the previous feedback information when feedback information is periodically transmitted, or a series of video data packets transmitted by the server to the base station during a previous time period when feedback information is event-based transmitted.

The second video data packet received by the first receiving unit 201 may be: a set of video data packets, which is obtained by encapsulating an encoded stream of each region into a video data packet respectively by the server, where the encoded streams of regions with different importance are obtained by encoding data in the regions with different importance in a video image according to different encoding modes. The second video data packet may include a video data packet of a one-frame or a multi-frame video image, encoded streams of regions with different importance are obtained by encoding data in regions with different importance in each frame of video image according to different encoding modes, and then encoded streams of each region are encapsulated into a video data packet respectively, thus each of the regions with different importance in the second video data packet has one or more video data packets.

After receiving a first video data packet transmitted by the base station, the user equipment will detect reception on the user equipment itself based on the first video data packet, and will transmit a parameter representing the reception on the user equipment itself to the base station in the manner of first feedback information. Specifically, the manner of the first feedback information may be a manner such as a PDCP status report, a RLC status report, an MAC CE, and an RRC message; may use an existing message to which a new IE is added, and may also use a new message.

The first feedback information received by the first receiving unit 201 may include: at least one of parameters including relative time delay, packet loss ratio, average throughput, and data amount of a receive buffer or a play-out buffer of the user equipment. The relative time delay refers to a relative time delay of a video data packet arriving later with reference to a video data packet of a certain frame arriving previously. The packet loss ratio may be a video data packet discarded by the user equipment due to the video data packet arrives at the receive buffer of the user equipment too late and thus cannot be decoded; may also be a total packet loss ratio detected by the user equipment, which includes a packet loss during a transmission process, and a packet discarded by the user equipment due to arriving too late. The average throughput is an average throughput of video data packets measured by the user equipment during a measuring time. The data amount of the receive buffer or the play-out buffer of the user equipment is the quantity of video data packets in the receive buffer or the play-out buffer of the user equipment.

The first processing unit 202 is configured to perform a scheduling process according to the first feedback information received by the first receiving unit.

The first processing unit 202 is specifically configured to: read encoded streams of regions with different importance in the second video data packet after the first receiving unit 201 receives the second video data packet; store video data packets, which are obtained by encapsulating the encoded streams of regions with different importance in the second video data packet, into different buffers respectively, or, configuring different RBs respectively for the video data packets which are obtained by encapsulating the encoded streams of regions with different importance.

In the case that the first feedback information, for the first video data packet, which is transmitted by the user equipment, and received by the first receiving unit 201, includes at least one of parameters including relative time delay, packet loss ratio, average throughput, data amount of a play-out buffer, the first processing unit is specifically configured to compare the first feedback information with second feedback information; if the result of the comparison includes at least one of the following circumstances: the relative time delay becomes shorter, the packet loss ratio becomes lower, the average throughput is increased, and the data amount of the play-out buffer is increased; then the first processing unit raises priority of a video data packet obtained by encapsulating an encoded stream of data in a least important region, does not discard the second video data packet, and reduces a scheduling priority of the user equipment; if a result of the comparison comprises at least one of following circumstances: the relative time delay becomes longer, the packet loss ratio becomes higher, the average throughput is decreased, and the data amount of the play-out buffer data amount is decreased; then the scheduling process is performed according to at least one of following manners: discarding a video data packet obtained by encapsulating an encoded stream of data in a least important region, reducing a scheduling priority of the video data packet obtained by encapsulating an encoded stream of data in the least important region, raising a scheduling priority of a video data packet obtained by encapsulating an encoded stream of data in a most important region, and raising a scheduling priority of the user equipment; where the second feedback information being feedback information for a previous set of video data packets of the first video data packet.

In the case that the first feedback information includes data amount of the receive buffer of the user equipment, the first processing unit 201 is specifically configured to raise the scheduling priority of the user equipment, and/or, discard a video data packet obtained by encapsulating an encoded stream of data in a least important region, when the data amount of the receive buffer is less than or equal to a predetermined first minimum protection threshold; and/or, the first processing unit is specifically configured to reduce the scheduling priority of the user equipment, when the data amount of the receive buffer is greater than or equal to a predetermined first highest protection threshold.

The first minimum protection threshold value or the first highest protection threshold value may be default configurations of a protocol, i.e. may be preset within the base station; may also be transmitted by the server to the base station; may still be reported by the user equipment to the base station, where a message for reporting the first minimum protection threshold value by the user equipment may be an MAC CE, may also be an RRC message; may be an existing message to which a new IE is added, and may also be a new message. The first minimum protection threshold value and the first highest protection threshold value take different values.

The first transmitting unit 203 is configured to transmit the second video data packet to the user equipment according to the result of the scheduling process, after the first processing unit 202 performs the scheduling process.

After performing the scheduling process to the user equipment or the second video data packet by the first processing unit 202, the first transmitting unit 203 will transmit the second video data packet to the user equipment according to the result of the scheduling process.

It should be noted that when a server transmits a first set of vide data packets to a user equipment through a base station, since that the user equipment has not received a video data packet, the user equipment does not transmit feedback information to the base station, hence, the first receiving unit 201 of the base station does not receive the first feedback information, the first processing unit 202 does not need to perform a scheduling process to the first set of vide data packets, and directly transmits the first set of vide data packets to the user equipment transparently.

Further, the first receiving unit 201 of the base station will receive video application state information at any time, where the video application state information is transmitted by the user equipment to the base station at any time. If the video application state information is off, the first processing unit 203 stops the scheduling process and transmission of a subsequent video data packet for the user equipment; or transmits a stop notice to the server, so that the server stops transmission of a subsequent video data packet for the user equipment; if the video application state information is stop or pause, the first processing unit 203 pauses the scheduling process and transmission of a subsequent video data packet for the user equipment; or transmits a pause notice to the server, so that the server pauses transmission of a subsequent video data packet for the user equipment; if the video application state information is buffer, the base station continues with the scheduling process and transmission of a subsequent video data packet for the user equipment.

The server in embodiments of the present application may be a terminal device which may be used for receiving and transmitting a video, may be an independent device, and may also be installed on other network devices in a network system. The base station includes but is not limited to an eNB (evolved Node B, evolved base station), a NB (Node B, base station node), a BS (Base Station Controller, base station), and a femto (Home eNB, home base station).

The base station as shown in FIG. 2 can be used for implementing the method as shown in FIG. 1 according to embodiments of the present application.

Embodiments of the present application provide a method for video transmission and a base station, the base station receives a second video data packet transmitted by a server and first feedback information about a first video data packet transmitted by a user equipment, and performs a scheduling process according to the first feedback information, and transmits the second video data packet to the user equipment according to the result of the scheduling process after the scheduling process, therefore, the base station does not need to transmit the feedback information to the server again, thereby reducing the feedback time, that is, the base station can perform the scheduling process by utilizing the feedback information in time, therefore, resources can be fully used or data loss can be reduced, the real-time performance of video transmission is improved, and air-interface resources are fully used, thus system performance is improved.

Embodiment 2

Figure 3:
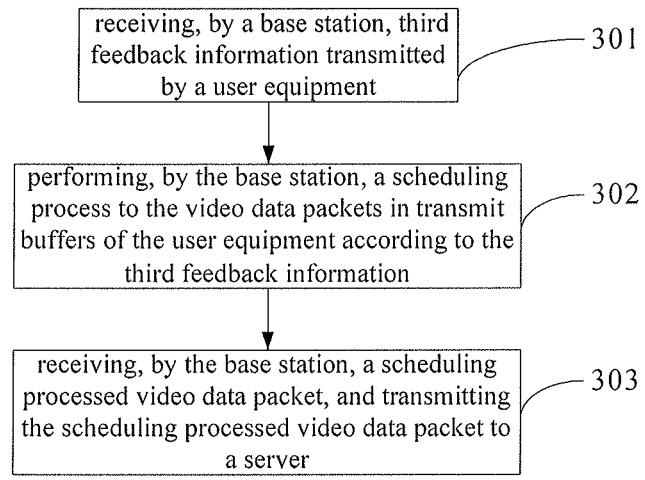
FIG. 3 is a schematic flow chart of a method for video transmission according to Embodiment 2 of the present application.

Embodiments of the present application provide a method for video transmission, where the method is, transmitting, by a user equipment, a video data packet to a server. As shown in FIG. 3, the method includes the following steps of:

301, receiving, by a base station, third feedback information transmitted by a user equipment.

The third feedback information is the quantity of video data packets in each transmit buffer of the user equipment.

The user equipment will detect the quantity of video data packets in each transmit buffer of the user equipment regularly, and will transmit the quantity of the video data packets in transmit buffers to the base station in the manner of third feedback information. Specifically, the manner of the third feedback information may be a manner such as a PDCP status report, a RLC status report, an MAC CE, and an RRC message; may use an existing message to which a new IE is added, and may also use a new message.

302, performing, by the base station, a scheduling process to the video data packets in transmit buffers of the user equipment according to the third feedback information.

The video data packets in transmit buffers of the user equipment may be: a set of video data packets, which is obtained by encapsulating an encoded stream of each region into a video data packet respectively by the user equipment, wherein the encoded streams of regions with different importance are obtained by encoding data in the regions with different importance in a video image according to different encoding modes; the video data packets are transmitted by using one or a plurality of data bearers/connections.

Alternatively, the base station may read the encoded stream information corresponding to the video data packets.

Specifically, the base station may read the video data packets by adopting a DPI technique, so as to distinguish the encoded streams corresponding to the video data packets.

After reading the encoded stream information corresponding to the video data packets, the base station may also configure different RBs for the video data packets, so that the base station can perform the scheduling process to subsequent video data packets corresponding to the encoded streams of different regions respectively.

The different RBs have different scheduling priorities. Each of the RBs corresponds to one PDCP entity and one RLC entity, i.e. a plurality of RBs corresponds to a same video service. The base station configures a new RB for a user equipment through a dedicated massage. The dedicated message may be a RRC Connection Reconfiguration message, and may also be a new RRC message. After receiving the new RB configuration transmitted by the base station, the user equipment applies the configuration message. Different video data streams are stored in corresponding receive buffers or in corresponding PDCP/RLC entities for transmission.

The third feedback information is the quantity of video data packets in each transmit buffer of the user equipment. If the data amount of the transmit buffers of the user equipment is less than or equal to a predetermined second minimum protection threshold, reduce a priority of the video data packets in the transmit buffers of the user equipment; if the data amount of the transmit buffers of the user equipment is greater than or equal to a predetermined second highest protection threshold, raise a priority of the video data packets in the transmit buffers of the user equipment.

The second minimum protection threshold value and the second highest protection threshold value may be default configurations of a protocol, may also be transmitted by the server to the base station, and may still be reported by the user equipment to the base station. A message for reporting the second minimum protection threshold value may be an MAC CE, may also be an RRC message; may be an existing message to which a new IE is added, and may also be a new message.

Alternatively, the third feedback information may also be a video encoding rate of the user equipment; if the base station receives the video encoding rate transmitted by the user equipment, the base station may perform a scheduling with reference to a BSR (Buffer Status Report) received simultaneously. Specifically, the base station may calculate data amount of each frame of video image based on the video encoding rate, and calculate a reasonable allocation of uplink transmission resources to the user equipment with reference to BSR information, so as to guarantee a smooth transmission of video data packets. Alternatively, the user equipment may report buffer information of the different video data packets to the base station respectively, when transmitting the BSR to the base station for requesting uplink transmission resources.

303, receiving, by the base station, a scheduling processed video data packet, and transmitting the scheduling processed video data packet to a server.

After performing the scheduling process to the video data packets in transmit buffers of the user equipment, the base station will receive video data packets transmitted by the user equipment according to the result of the scheduling process, and transmit the video data packets to the server.

It should be noted that all the foregoing steps may be performed in a continuous loop.

Figure 4:
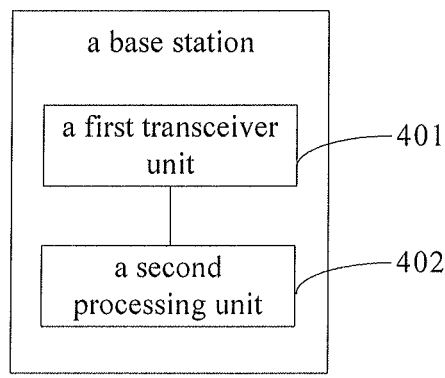
FIG. 4 is a structural block diagram of a base station according to Embodiment 2 of the present application.

Embodiments of the present application also provide a base station. As shown in FIG. 4, the base station includes: a first transceiver unit 401 and a second processing unit 402.

The first transceiver unit 401 is configured to receive third feedback information transmitted by a user equipment.

The third feedback information is the quantity of video data packets in each transmit buffer of the user equipment.

The user equipment will detect the quantity of video data packets in each transmit buffer of the user equipment regularly, and will transmit the quantity of the video data packets in transmit buffers to the base station in the manner of third feedback information. Specifically, the manner of the third feedback information may be a manner such as a PDCP status report, a RLC status report, an MAC CE, and an RRC message; may use an existing message to which a new IE is added, and may also use a new message.

The second processing unit 402 is configured to perform a scheduling process to the video data packets in the transmit buffers of the user equipment according to the third feedback information received by the first transceiver unit 401.

The video data packets in the transmit buffers of the user equipment may be: a set of video data packets, which is obtained by encapsulating an encoded stream of each region into a video data packet respectively by the user equipment, wherein the encoded streams of regions with different importance are obtained by encoding data in the regions with different importance in a video image according to different encoding modes. The video data packet may include a video data packet of a one-frame or a multi-frame video image, encoded streams of regions with different importance are obtained by encoding data in regions with different importance in each frame of video image according to different encoding modes, and then encoded streams of each region are encapsulated into a video data packet respectively, thus each of the regions with different importance in the video data packet has one or more video data packets. A specific coding mode thereof has been described in details in Embodiment 1, and will not be repeated herein.

Alternatively, the second processing unit 402 is configured to read encoded streams of regions with different importance in received video data packets; and configure different radio bearers RB respectively for the video data packets which are obtained by encapsulating the encoded streams of regions with different importance in the received video data packets.

Specifically, the second processing unit 402 may read the video data packets by adopting a DPI technique, so as to distinguish the encoded streams corresponding to the video data packets. After reading the encoded stream information corresponding to the video data packets, the second processing unit 402 may also configure different RBs for the video data packets, so that the second processing unit 402 can perform the scheduling process to subsequent video data packets corresponding to the encoded streams of regions with different importance. The different RBs have different scheduling priorities. Each of the RBs corresponds to one PDCP entity and one RLC entity, i.e. a plurality of RBs corresponds to a same video service. The base station configures a new RB for a user equipment through a dedicated massage. The dedicated message may be a RRC Connection Reconfiguration message, and may also be a new RRC message. After receiving the new RB configuration transmitted by the base station, the user equipment applies the configuration message. The different video data streams are stored in corresponding receive buffers or in corresponding PDCP/RLC entities for transmission.

The second processing unit 402 is further configured to: if the quantity of the video data packets in the transmit buffers of the user equipment is less than or equal to a predetermined second minimum protection threshold, reduce a priority of the video data packets in the transmit buffers of the user equipment; if the quantity of the video data packets in the transmit buffers of the user equipment is greater than or equal to a predetermined second highest protection threshold, raise a priority of the video data packets in the transmit buffers of the user equipment.

The second minimum protection threshold value and the second highest protection threshold value may be default configurations of a protocol, may also be transmitted by the server to the base station, and may still be reported by the user equipment to the base station. A message for reporting the second minimum protection threshold value may be an MAC CE, may also be an RRC message; may be an existing message to which a new IE is added, and may also be a new message. The second minimum protection threshold value and the second highest protection threshold value take different values.

Alternatively, the third feedback information may also be a video encoding rate of the user equipment; if the base station receives the video encoding rate transmitted by the user equipment, the base station may perform a scheduling with reference to a BSR received simultaneously. Specifically, the base station may calculate data amount of each frame of video image based on the video encoding rate, and calculate a reasonable allocation of uplink transmission resources to the user equipment with reference to BSR information, so as to guarantee a smooth transmission of video data packets. Alternatively, the user equipment may report buffer information of the different video data packets to the base station respectively, when transmitting the BSR to the base station for requesting uplink transmission resources.

The first transceiver unit 401 is further configured to receive a scheduling processed video data packet, and transmit the scheduling processed video data packet to a server.

After the second processing unit 402 performs the scheduling process to the video data packets in transmit buffers of the user equipment, the first transceiver unit 401 will receive the video data packets transmitted by the user equipment according to the result of the scheduling process, and transmit the video data packets to the server.

The server in embodiments of the present application may be a terminal device which may be used for receiving and transmitting a video, may be an independent device, and may also be installed on other network devices in a network system. The base station includes but is not limited to an eNB, a NB, a BS, and a femto.

The base station as shown in FIG. 4 can be used for implementing the method as shown in FIG. 3 according to embodiments of the present application.

Embodiments of the present application provide a method and a device for video transmission, the base station receives third feedback information transmitted by a user equipment, and performing a scheduling process to video data packets in transmit buffers of the user equipment according to the third feedback information; then receives a scheduling processed video data packet, and transmits the scheduling processed video data packet to a server, therefore, the base station does not need to transmit the feedback information to the server again, thereby reducing the feedback time, that is, the base station can perform the scheduling process by utilizing the feedback information in time, therefore, resources can be fully used or data loss can be reduced, the real-time performance of video transmission is improved, and air-interface resources are fully used, thus system performance is improved.

Embodiment 3

Figure 5:
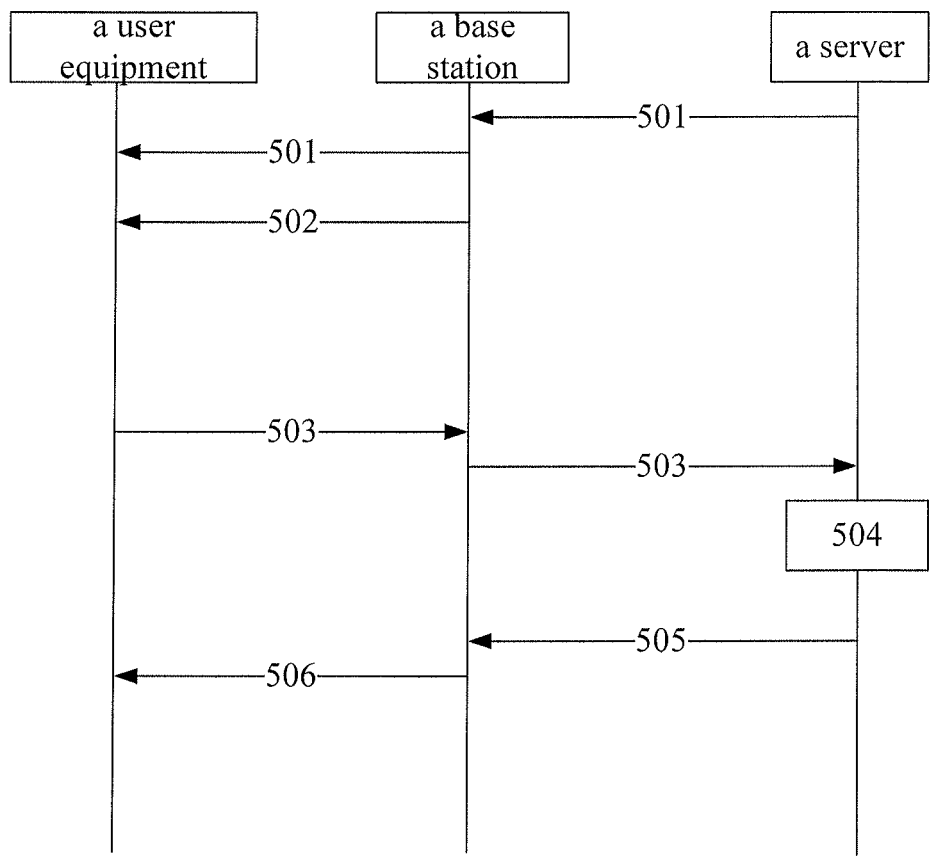
FIG. 5 is a schematic flow chart of a method for video transmission according to Embodiment 3 of the present application.

Embodiments of the present application provide a method for video transmission. As shown in FIG. 5, the method includes the steps of:

501, encapsulating, by a server, encoded video data into a video data packet, and then transmitting to a user equipment through a base station.

The server encodes the data of a video image according to a certain encoding level, and encapsulates the encoded data into a video data packet, then the server transmits the video data packet to the user equipment through the base station, which is finally received by the user equipment for use.

Specifically, during the encoding process, since the final observer of an image is human eyes which have different visual sensitivities for different regions, thus data of the video image may be divided into data in regions with different importance according to the different visual sensitivities of the human eyes, and then the encoding is performed according to different encoding levels, thereby a plurality of encoded streams corresponding to regions with different importance is obtained. Specifically, the regions with different importance may employ different coding levels, for example, the most important region employs an encoding type with the highest level, and the least important region employs an encoding type with the lowest level. Herein, the data of the video image may be divided into data in two or more than two regions according to the different visual sensitivities of the human eyes, which is not limited thereto. The encoding mode with the highest level is the encoding mode according to which the clearest image is obtained by encoding, and the encoding mode with the lowest level is the encoding mode according to which the most unclear image is obtained by encoding.

502, detecting, by the base station, wireless network state and transmitting network state information to the user equipment.

The base station detects current wireless network state, and transmits network state information to a user equipment.

Specifically, the base station may set a value of ECN (explicit congestion notification) field in a downlink IP packet to a corresponding value representing that whether the network is congested or not, for example, "11" indicates congested, "10" or "01" indicates normal, "00" indicates idle, etc, there are many cases for the setting of the value, which is not limited thereto. The base station transmits the IP packet including network state information to the user equipment.

503, receiving, by the user equipment, network state information transmitted by the base station and feeding back the network state information to a server.

The user equipment receives the IP packet including the network state information, parses the network state information in the IP packet, and feeds back the network state information to the server through the base station.

504, adjusting, by the server, an encoding level according to the network state information and encoding the video data according to the adjusted encoding level, and encapsulating the encoded data into a video data packet.

The obtaining the video data packet through encoding according to the network state information includes: when the network state information is network congestion, reducing the encoding level of data such as selecting an encoding type with lower quality and/or selecting a lower video coding rate, and encoding the video image data according to the encoding level, and encapsulating the encoded data into the video data packet; when the network state information is idle network, raising the encoding level of data such as selecting an encoding type with higher quality and/or selecting a higher video coding rate, and encoding the video image data according to the encoding level, and encapsulating the encoded data into the video data packet.

In practical applications, when information fed back by the user equipment also includes other feedback information, e.g. the relative time delay, the packet loss ratio, the initial play-out time delay, and the average throughput, etc., these feedback information is information fed back by the user equipment to the server in the prior art, the server will adjust the encoding with reference to these feedback information, a specific adjusting method thereof is clearly known by those skilled in the art, and will not be repeated herein.

505, transmitting, by the server, a processed video data packet to the base station.

506, forwarding, by the base station, the processed video data packet to the user equipment.

It should be noted that each of the foregoing steps is performed continuously, thus the order is not limited to what listed above during practical work.

Embodiments of the present application provide a method for video transmission, the base station detects wireless network state and transmits network state information to a user equipment, so that the user equipment feeds back the network state information to a server, and the server adjusts an encoding level according to the received network state information and encoded the video data according to the adjusted coding level, encapsulates the coded data into a video data packet, transmits the processed video data packet to a base station, so that the base station forwards the processed video data packet to the user equipment, that is, the network state information is detected by the base station, which is more prompt than the feedback information detected by the user equipment, thereby reducing the feedback time, that is, the server can perform the scheduling process by utilizing the network state information in time, therefore, resources can be fully used or data loss can be reduced, the real-time performance of video transmission is improved, and air-interface resources are fully used, thus system performance is improved.

Figure 6:
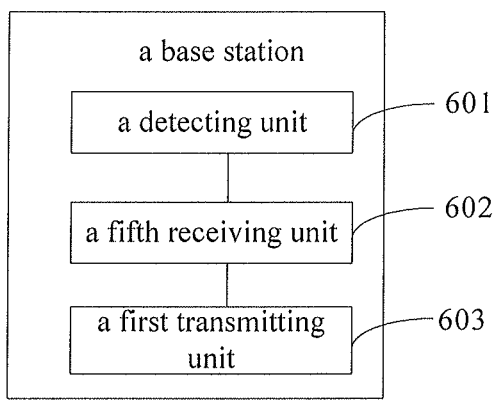
FIG. 6 is a structural block diagram of a base station according to Embodiment 3 of the present application.

Embodiments of the present application provide a base station, as shown in FIG. 6, including: a detecting unit 601, a fifth receiving unit 602, and a first transmitting unit 603.

The detecting unit 601 is configured to detect wireless network state and transmit network state information to a user equipment, so that the user equipment feeds back the network state information to a server The detecting unit 601 detects current wireless network state, and transmits network state information to a user equipment, so that the user equipment feeds back the network state information to the server.

Specifically, the base station may set a value of ECN field in a downlink IP packet to a corresponding value representing that whether the network is congested or not, for example, "11" indicates congested, "10" or "01" indicates normal, "00" indicates idle, etc, there are many cases for the setting of the value, which is not limited thereto. The base station transmits the IP packet including network state information to the user equipment, so that the user equipment parses the network state information in the IP packet, and feeds back the network state information to the server.

The fifth receiving unit 602 is configured to receive a video data packet obtained by the server through encoding according to the network state information after the detecting unit 601 detects the network state information.

The first transmitting unit 603 is configured to transmit the video data packet received by the fifth receiving unit 602 to the user equipment.

The server will adjust the encoding level according to the network state information fed back by the user equipment and encoding the video data according to the adjusted encoding level, encapsulate the encoded data into a video data packet and transmit to the base station. The fifth receiving unit 602 of the base station receives the video data packet obtained by the server through encoding according to the network state information, and the first transmitting unit 603 transmits the video data packet to the user equipment.

Figure 7:
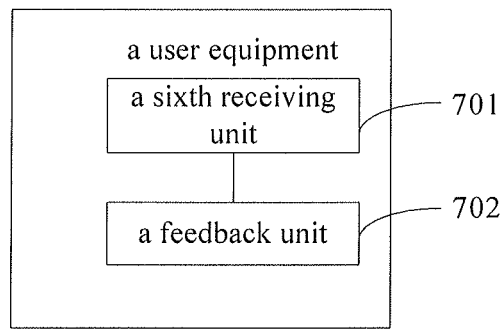
FIG. 7 is a structural block diagram of a user equipment according to Embodiment 3 of the present application.

Embodiments of the present application provide a user equipment, as shown in FIG. 7, including: a sixth receiving unit 701 and a feedback unit 702.

The sixth receiving unit 701 is configured to receive network state information transmitted by a base station.

The feedback unit 702 is configured to feedback the network state information received by the sixth receiving unit 701 to a server, so that the server obtains a video data packet through encoding according to the network state information.

After detecting current wireless network state, a base station will transmit network state information to a user equipment. The user equipment receives the network state information, and feeds back the network state information to a server, so that the server obtains a video data packet through encoding according to the network state information.

Specifically, the base station may set a value of ECN field in a downlink IP packet to a corresponding value representing that whether the network is congested or not, for example, "11" indicates congested, "10" or "01" indicates normal, "00" indicates idle, etc, there are many cases for the setting of the value, which is not limited thereto. The base station transmits the IP packet including network state information to the user equipment, the user equipment receives the IP packet including the network state information, parses the network state information in the IP packet, and feeds back the network state information to the server.

The sixth receiving unit 701 is further configured to receive the video data packet forwarded by the base station.

The sixth receiving unit 701 of the user equipment will always receive the video data packets forwarded by the base station.

Figure 8:
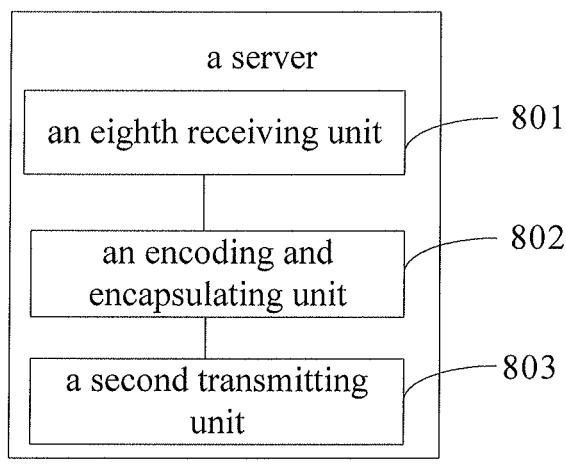
FIG. 8 is a structural block diagram of a server according to Embodiment 3 of the present application.

Embodiments of the present application provide a server, as shown in FIG. 8, including: an eighth receiving unit 801, an encoding and encapsulating unit 802, and a second transmitting unit 803.

The eighth receiving unit 801 is configured to receive network state information fed back by a user equipment.

After detecting current wireless network state, a base station will transmit network state information to a user equipment. The user equipment receives the network state information and feeds back the network state information to a server, the eighth receiving unit 801 of the server receives the network state information fed back by the user equipment.

In practical applications, besides including the network state information, the information fed back by the user equipment also includes other feedback information in sometimes, e.g. the relative time delay, the packet loss ratio, the initial play-out time delay, the average throughput, etc., these feedback information is information fed back by the user equipment to the server in the prior art, which is clearly known by those skilled in the art, and will not be repeated herein.

The encoding and encapsulating unit 802 is configured to adjust an encoding level according to the network state information received by the eighth receiving unit 801 and encoding video data according to the adjusted encoding level, and encapsulate the encoded data into a video data packet.

Obtaining the video data packet through encoding according to the network state information includes: when the network state information is network congestion, reducing the encoding level of data and encoding video image data according to the encoding level, and encapsulating the encoded data into the video data packet; when the network state information is idle network, raising the encoding level of data and encoding the video image data according to the encoding level, and encapsulating the encoded data into the video data packet.

In practical applications, when information fed back by the user equipment also includes other feedback information, e.g. the relative time delay, the packet loss ratio, the initial play-out time delay, the average throughput etc., these feedback information is information fed back by the user equipment to the server in the prior art, the server will adjust the encoding with reference to these feedback information, a specific adjusting method thereof is clearly known by those skilled in the art, and will not be repeated herein.

The second transmitting unit 803 is configured to transmit the video data packet encapsulated by the code encapsulating unit 802 to a base station.

The server transmits the video data packet encoded according to the adjusted encoding level to the base station, so that the base station forwards the processed video data packet to the user equipment.

The server in embodiments of the present application may be a terminal device which may be used for receiving and transmitting a video, may be an independent device, and may also be installed on other network devices in a network system. The base station includes but is not limited to an eNB, a NB, a BS, and a femto.

The device as shown in FIGS. 6-8 can be used for implementing the method as shown in FIG. 5 according to embodiments of the present application.

Embodiments of the present application provide a server, a base station, and a user equipment, the base station detects wireless network state and transmits network state information to a user equipment, so that the user equipment feeds back the network state information to a server, and the server adjusts an encoding level according to the received network state information and encoded the video data according to the adjusted coding level, encapsulates the coded data into a video data packet, transmits the processed video data packet to a base station, so that the base station forwards the processed video data packet to the user equipment, that is, the network state information is detected by the base station, which is more prompt than the feedback information detected by the user equipment, thereby reducing the feedback time, that is, the server can perform the scheduling process by utilizing the network state information in time, therefore, resources can be fully used or data loss can be reduced, the real-time performance of video transmission is improved, and air-interface resources are fully used, thus system performance is improved.

Persons of ordinary skill in the art may understand that all or a part of the steps of the methods according to embodiments of the present application may be implemented by a relevant hardware instructed by the program. The program may be stored in a computer readable storage medium. When the program runs, the steps of the methods according to the foregoing embodiments are performed. The mentioned storage medium includes: various media which may store program codes, such as a read-only memory (ROM), a random access memory (RAM), a disk, and a CD.

The above are merely specific embodiments of the present application. However, the protection scope of the present application shall not be limited thereto. A modification or a replacement which may be easily thought of by any technical persons familiar with the techniques in this field shall be included within the protection scope of the present application. Therefore, the protection scope of the present application should be subject to the claims.

What is claimed is:

1. A method for video transmission, comprising:
   receiving, by a base station, a second set of video data packets from a server, wherein the second set of video data packets is a current set of video data packets, and is obtained by encapsulating an encoded stream of each region into a video data packet respectively, and encoded streams of regions with different importance are obtained by encoding data in the regions with different importance in a video image according to different encoding modes;
   reading, by the base station, the encoded streams of regions with different importance in the second set of video data packets;
   storing, by the base station, the video data packets, which are obtained by encapsulating the encoded streams of regions with different importance in the second set of video data packets, into different buffers respectively, or, configuring different radio bearers (RB) respectively for the video data packets which are obtained by encapsulating the encoded streams of regions with different importance;
   receiving, by the base station, first feedback information about a first video data packet from a user equipment device, and performing a scheduling process according to the first feedback information and different importance of encoded streams of different regions in each frame of video image encapsulated in the second set of video data packets, wherein the first set of video data packets is a previous set of video data packets of the second set of video data packets, and the previous set of video data packets is received from the server and forwarded to the user equipment device by the base station; and
   transmitting, by the base station, the second set of video data packets to the user equipment device according to a result of the scheduling process.

2. The method according to claim 1, wherein, the first feedback information comprises: at least one of parameters: relative time delay, packet loss ratio, average throughput, and data amount of a play-out buffer;
   the performing of the scheduling process according to the first feedback information, comprising:
   comparing the first feedback information with second feedback information, wherein the second feedback information being feedback information for a previous set of video data packets of the first video data packet;
   if a result of the comparison comprises at least one of following circumstances: the relative time delay becomes shorter, the packet loss ratio becomes lower, the average throughput is increased, and the data amount of the play-out buffer is increased;
      then the scheduling process is performed according to at least one of following manners: raising priority of a video data packet obtained by encapsulating an encoded stream of data in a least important region, not discarding the second set of video data packets, and reducing a scheduling priority of the user equipment device;
   if a result of the comparison comprises at least one of following circumstances: the relative time delay becomes longer, the packet loss ratio becomes higher, the average throughput is decreased, and the data amount of the play-out buffer is decreased;
      then the scheduling process is performed according to at least one of following manners: discarding a video data packet obtained by encapsulating an encoded stream of data in a least important region, reducing a scheduling priority of the video data packet obtained by encapsulating a an encoded stream of data in the least important region, raising a scheduling priority of a video data packet obtained by encapsulating an encoded stream of data in a most important region, and raising a scheduling priority of the user equipment device.

3. The method according to claim 1, wherein, the first feedback information comprises: data amount of a receive buffer of the user equipment device;
  wherein the performing of the scheduling process according to the first feedback information, comprising one of:
    if the data amount of the receive buffer is less than or equal to a predetermined first minimum protection threshold, performing one or more of:
      raising a scheduling priority of the user equipment device, and,
      discarding a video data packet obtained by encapsulating an encoded stream of data in a least important region; and
    if the data amount of the receive buffer is greater than or equal to a predetermined first highest protection threshold, reducing the scheduling priority of the user equipment device.

4. The method according to claim 1, further comprising: receiving, by the base station, video application state information from the user equipment device;
  if the video application state information is off, performing one of:
    stopping, by the base station, the scheduling process and transmission of a subsequent video data packet for the user equipment device; or
    transmitting, by the base station, a stop notice to the server, so that the server stops transmission of a subsequent video data packet for the user equipment device;
  if the video application state information is stop or pause, performing one of:
    pausing, by the base station, the scheduling process and transmission of a subsequent video data packet for the user equipment device; or
    transmitting, by the base station, a pause notice to the server, so that the server pauses transmission of a subsequent video data packet for the user equipment device;
  if the video application state information is buffer, continuing, by the base station, with the scheduling process and transmission of a subsequent video data packet for the user equipment device.

5. A base station, comprising at least a processor operating in conjunction with at least a memory storing code for:
  receiving a second set of video data packets from a server, wherein the second set of video data packets is a current set of video data packets, and is obtained by encapsulating an encoded stream of each region into a video data packet respectively, and encoded streams of regions with different importance are obtained by encoding data in the regions with different importance in a video image according to different encoding modes;
  reading the encoded streams of regions with different importance in the second set of video data packets;
  storing the video data packets, which are obtained by encapsulating the encoded streams of regions with different importance in the second set of video data packets, into different buffers respectively, or, configuring different radio bearers (RB) respectively for the video data packets which are obtained by encapsulating the encoded streams of regions with different importance;
  receiving first feedback information about a first video data packet from a user equipment device, and performing a scheduling process according to the first feedback information and different importance of encoded streams of different regions in each frame of video image encapsulated in the second set of video data packets, wherein the first set of video data packets is a previous set of video data packets of the second set of video data packets, and the previous set of video data packets is received from the server and forwarded to the user equipment device by the base station; and
  transmitting the second set of video data packets to the user equipment device according to a result of the scheduling process.

6. The base station according to claim 5,
  wherein when the first feedback information comprises at least one of: relative time delay, packet loss ratio, average throughput, and data amount of a play-out buffer,
  the scheduling process comprises:
  comparing the first feedback information with second feedback information;
  if a result of the comparison comprises at least one of following circumstances: the relative time delay becomes shorter, the packet loss ratio becomes lower, the average throughput is increased, and the data amount of the play-out buffer is increased;
    then the scheduling process is performed according to at least one of the following manners: raising priority of a video data packet obtained by encapsulating an encoded stream of data in a least important region, not discarding the second set of video data packets, and reducing a scheduling priority of the user equipment device;
  if a result of the comparison comprises at least one of following circumstances: the relative time delay becomes longer, the packet loss ratio becomes higher, the average throughput is decreased, and the data amount of the play-out buffer data amount is decreased;
    then the scheduling process is performed according to at least one of following manners: discarding a video data packet obtained by encapsulating an encoded stream of data in a least important region, reducing a scheduling priority of the video data packet obtained by encapsulating an encoded stream of data in the least important region, raising a scheduling priority of a video data packet obtained by encapsulating an encoded stream of data in a most important region, and raising a scheduling priority of the user equipment device; wherein the second feedback information being feedback information for a previous set of video data packets of the first set of video data packets;
  when the first feedback information comprises data amount of a receive buffer of the user equipment device,
  the scheduling process comprises at least one of:
    raise a scheduling priority of the user equipment device, and/or, discard a video data packet obtained by encapsulating an encoded stream of data in a least important region, when the data amount of the receive buffer is less than or equal to a predetermined first minimum protection threshold; and reduce the scheduling priority of the user equipment device, when the data amount of the receive buffer is greater than or equal to a predetermined first highest protection threshold.

7. The base station according to claim 5, wherein, the memory further storing code for:

receiving video application state information from the user equipment device;

when the video application state information received is off, stopping the scheduling process and transmission of a subsequent video data packet for the user equipment device; or transmitting a stop notice to the server, so that the server stops transmission of a subsequent video data packet for the user equipment device;

when the video application state information is stop or pause, pausing the scheduling process and transmission of a subsequent video data packet for the user equipment device; or transmitting a pause notice to the server, so that the server pauses transmission of a subsequent video data packet for the user equipment device;

when the video application state information is buffer, continuing with the scheduling process and transmission of a subsequent video data packet for the user equipment device.

8. A method for video transmission, comprising:

receiving, by a base station, third feedback information from a user equipment device, wherein the third feedback information is quantity of video data packets in each transmit buffer of the user equipment device, wherein the video data packets in the transmit buffers of the user equipment device comprise: a set of video data packets which are obtained by encapsulating an encoded stream of each region into a video data packet respectively by the user equipment device, and the encoded streams of regions with different importance are obtained by encoding data in the regions with different importance in a video image according to different encoding modes;

reading, by the base station, the encoded streams of regions with different importance in received video data packets;

configuring, by the base station, different radio bearers (RB) respectively for the video data packets, which are obtained by encapsulating the encoded streams of regions with different importance, in the received video data packets;

performing, by the base station, a scheduling process to the video data packets in the transmit buffers of the user equipment device according to the third feedback information and different importance of encoded streams of different regions in each frame of video image;

receiving, by the base station, a scheduled processed video data packet from the user equipment device, and transmitting the scheduled processed video data packet to a server.

9. The method according to claim 8, wherein the performing, by the base station, the scheduling process to the video data packets in the transmit buffers of the user equipment device according to the third feedback information, comprising:

if the quantity of the video data packets in the transmit buffers of the user equipment device is less than or equal to a predetermined second minimum protection threshold, reducing a priority of the video data packets in the transmit buffers of the user equipment device;

if the quantity of the video data packets in the transmit buffers of the user equipment device is greater than or equal to a predetermined second highest protection threshold, raising a priority of the video data packets in the transmit buffers of the user equipment device.

10. A base station, at least a processor circuitry operating in conjunction with at least a memory storing codes for:

receiving, by a base station, third feedback information form a user equipment device, wherein the third feedback information is quantity of video data packets in each transmit buffer of the user equipment device, and the video data packets in the transmit buffers of the user equipment device comprise: a set of video data packets, which are obtained by encapsulating an encoded stream of each region into a video data packet respectively by the user equipment device, and the encoded streams of regions with different importance are obtained by encoding data in the regions with different importance in a video image according to different encoding modes;

reading encoded streams of regions with different importance in received video data packets; and configuring different radio bearers (RB) respectively for the video data packets which are obtained by encapsulating the encoded streams of regions with different importance and in the received video data packets;

performing, by the base station, a scheduling process to the video data packets in the transmit buffers of the user equipment device according to the third feedback information and different importance of encoded streams of different regions in each frame of video image;

receiving, by the base station, a scheduled processed video data packet from the user equipment device, and transmitting the scheduled processed video data packet to a server.

11. The base station according to claim 10, wherein:

if the quantity of the video data packets in the transmit buffers of the user equipment device is less than or equal to a predetermined second minimum protection threshold, reducing a priority of the video data packets in the transmit buffers of the user equipment device;

if the quantity of the video data packets in the transmit buffers of the user equipment device is greater than or equal to a predetermined second highest protection threshold, raising a priority of the video data packets in the transmit buffers of the user equipment device.

* * * * *